F. N. RUSSELL.
TROLLEY.
APPLICATION FILED MAY 16, 1910.
980,344.
Patented Jan. 3, 1911.
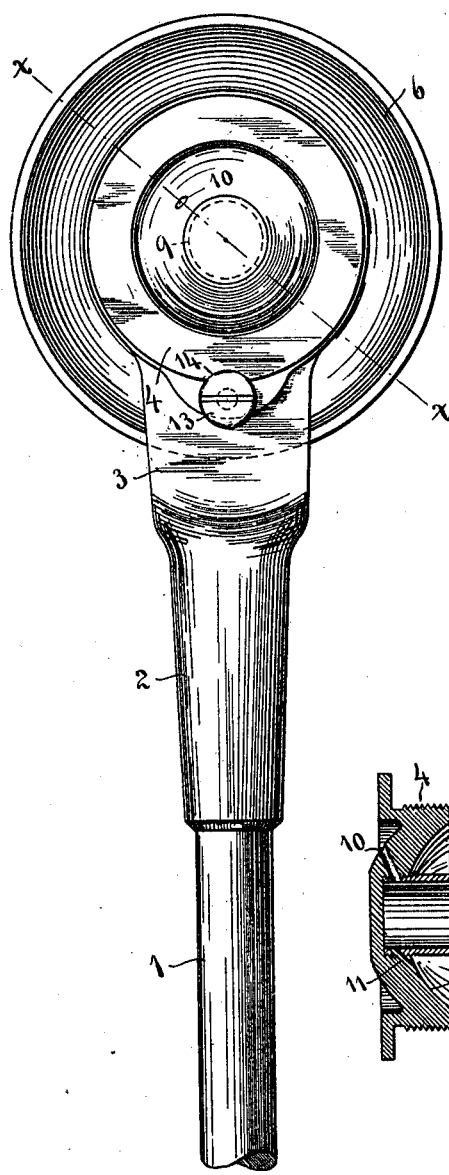
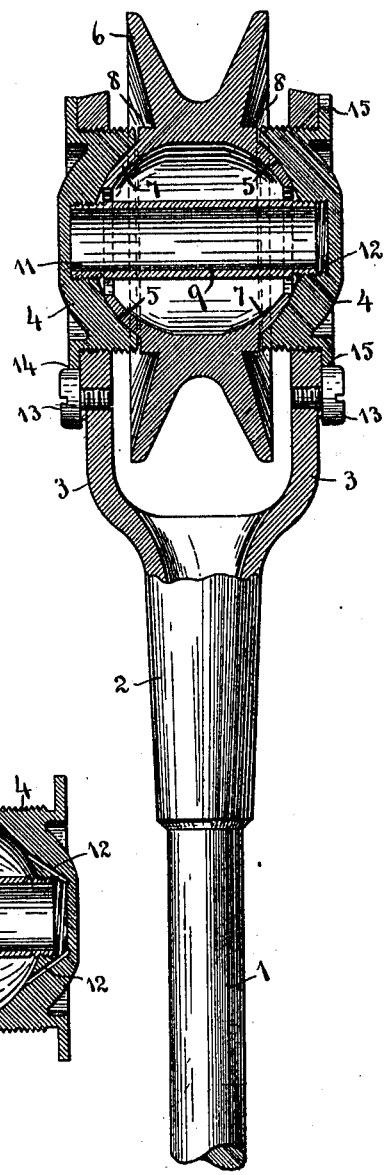
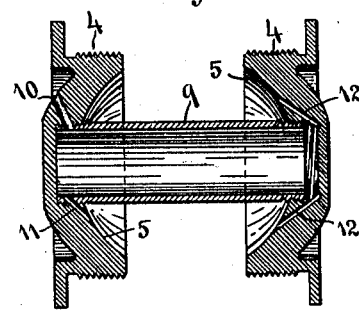
WITNESSES:
M. E. Verbeek.
INVENTOR
Frank N. Russell
BY Eugene Diven
ATTORNEY

UNITED STATES PATENT OFFICE.

FRANK N. RUSSELL, OF ELMIRA, NEW YORK.

TROLLEY.

980,344.    Specification of Letters Patent.    Patented Jan. 3, 1911.

Application filed May 16, 1910. Serial No. 561,530.

*To all whom it may concern:*

Be it known that I, FRANK N. RUSSELL, a citizen of the United States, residing at Elmira, in the county of Chemung and State of New York, have invented certain new and useful Improvements in Trolleys, of which the following is a specification.

This invention relates to improvements in trolley wheels for electric railroads, and in the mountings therefor; and more particularly to improvements in the trolley wheel construction as heretofore described in U. S. Letters Patent No. 805,096, granted to myself and Albert T. Lane, Nov. 21, 1905: the object of my present invention being to provide more efficient and positive means for lubricating the trolley wheel bearings.

I attain my object by constructing the trolley wheel and its mountings in the manner illustrated in the accompanying drawings, in which—

Figure 1 presents a side elevation of a trolley wheel and harp embodying my improvements; Fig. 2, a vertical section on the line of the axis of the harp; and Fig. 3, a detail showing a section through the trolley wheel bearings on the line $x$—$x$ in Fig. 1.

Like numerals designate like parts in the several views.

Upon the usual trolley pole 1 is mounted the harp 2, provided with flattened parallel side members 3 having screw threaded openings to receive the flanged bearing blocks or cups 4, which are screwed therein from the opposite sides of the harp. These cups are provided, as described in said Letters Patent, on their inner faces, with spherical sockets or bearings 5, to receive the spherical journals or enlargements 7, at the sides of the trolley wheel 6. At 8, on each side of the trolley wheel, the journals are provided with annular shoulders adapted to engage the inward edges of the bearing blocks, whereby the lateral tilting movement of the trolley wheel in its bearings will be limited; there being a sufficient clearance between the shoulders and the bearing blocks to allow for a slight play of the wheel in its bearings without interfering with the free rotation thereof.

The trolley wheel is hollow at its center, for lightness; but, instead of employing the chamber so formed for a lubricating receptacle, as described in said former Letters Patent, I provide a hollow bolt, or tube 9, which is screw threaded at each end into the blocks 4, said tubular bolt passing through the hollow wheel, and being of sufficient size to form a lubricant receptacle capable of carrying a sufficient supply of the lubricant to maintain the free running of the wheel for a long period of time. As shown in Fig. 3, the tubular bolt 9 is screwed permanently into the left hand block 4, and an oil supply hole 10 is drilled through the block into the interior of the bolt. A feed duct is provided at 11, by which oil is conducted from the receptacle to the bearing 5. The screw threads on the opposite end of the tubular bolt 9 are of the same pitch as the threads in the opening for the block 4 in the side member 3 of the harp; so that when the parts are assembled the right hand block, when screwed into the harp, will also be screwed upon the end of the hollow bolt. As shown in the drawings, there will be a space between the end of the bolt and the bottom of the screw socket in the right hand block 4, from which ducts 12, on diametrically opposite sides, lead to the bearing 5, whereby the oil will be conducted from the lubricant chamber to said bearing.

When assembling the parts, the trolley wheel will first be inserted between the side members 3 of the harp; then the left hand block 4, as shown in Figs. 2 and 3, with the hollow bolt attached, will be screwed into place, after which the right hand block will be screwed in until the bearings are brought up into proper adjustment against the journals 7 on the wheel. The bearing blocks will then be fastened against turning by means of the screws 13, which engage notches 14 and 15 on the flanges of the respective blocks. The notch 14 is so positioned on the left hand block that, when the trolley pole is set at the usual angle for the trolley wheel to engage the trolley wire, the filling duct 10 will be positioned above the oil receptacle, and the lubricating duct 11 will be positioned below said receptacle, thereby insuring the flow of the oil from the receptacle to the bearing 5. In order to insure this position of the ducts, only one notch will be provided in the flange of this bearing block. For a proper adjustment of the bearings, I provide the right hand block with at least two notches 15, set diametrically opposite one another; and so positioned that, when one of said notches is engaged by the lock screw 15, one of the ducts 12 will lead downwardly from the receptacle to the bearing 5 on said block. By this arrangement of the notches, a half turn may be given to the right hand block, in either direction, to adjust the bearings against the trolley wheel journals, and one or the other of the lubricating ducts 12 will always lead downward from the receptacle; thus insuring the flow of oil from the receptacle to the bearings at all times. By providing the right hand block with more of the notches and ducts, properly positioned relatively to one another, a finer adjustment of the bearings may be attained, if found desirable. I prefer, however, to use but the two, as the oil will then be fed to the bearing by but one duct at a time. A sufficiently close adjustment may be attained by adopting a suitable pitch for the screw threads to render the two point adjustment adequate. As so arranged the hollow bolt 9 serves not only as a lubricant receptacle, but also to prevent the spreading apart of the side members of the harp when the wheel is pressed up against the trolley wire. Moreover, by providing a stationary or fixed lubricant receptacle the effects of centrifugal force upon the oil when placed in a receptacle formed in the trolley wheel itself are avoided, and the oil will run from the receptacle to the last drop, there being free vent to the receptacle through the oil charging duct 10, which is maintained open at all times and in a substantially vertical position.

Without limiting myself to the details of construction as herein illustrated, what I claim as my invention and desire to secure by Letters Patent is—

1. The combination with a trolley fork, of bearing blocks screwed into openings in the fork, a trolley wheel having journals mounted in said blocks, a hollow bolt passing through the wheel and connecting the blocks together, an oil supplying duct leading into the interior of said bolt from the outward side of one of the blocks, and ducts leading from the interior of said bolt to the bearing surfaces on each of the blocks.

2. The combination with a trolley fork, of bearing blocks screwed into openings in the fork, a trolley wheel having journals mounted in said blocks, a hollow bolt passing through the wheel and connecting the blocks together, an oil supplying duct leading into the interior of said bolt from the outward side of one of the blocks, and ducts leading from the interior of said bolt to the bearing surfaces on each of the blocks, means whereby the one block will be positioned on the fork with the supplying duct leading downward to the bolt and the lubricating duct leading downward from the bolt when the trolley is in normal operating position, and means whereby the other block will be positioned with a lubricating duct leading downward from the bolt.

3. The combination with a trolley fork, of flanged bearing blocks screwed into openings in the fork, a trolley wheel having journals mounted in said blocks, a tubular lubricant receptacle passing through the wheel and joined to said blocks, an oil supplying duct leading into said receptacle from the outward side of one of the blocks, lubricating ducts leading from the receptacle to the bearing surface on each of the blocks, and locking screws on the harp adapted to engage notches pivoted therefor on the flanges of the blocks, said notches being so positioned with reference to the ducts on the respective blocks that said ducts will be in substantially vertical positions, when the wheel is in normal operating position, with the supplying duct opening upward.

4. The combination with a trolley fork having bearings in its arms, of a trolley wheel provided with journals mounted in said bearings, a tubular lubricant receptacle passing through the wheel and fixed to said bearings at each end, an oil supplying duct leading through one of said bearings to the receptacle and lubricating ducts leading from the receptacle to each of the bearing surfaces.

In testimony whereof I have affixed my signature, in presence of two witnesses.

FRANK N. RUSSELL.

Witnesses:
  M. E. VERBECK,
  EUGENE DIVEN.